United States Patent
Schneider et al.

(10) Patent No.: US 9,187,870 B2
(45) Date of Patent: Nov. 17, 2015

(54) SWEEPING DEVICE FOR A CHILDREN'S VEHICLE, PARTICULARLY FOR A PEDAL VEHICLE

(71) Applicant: Franz Schneider GmbH & Co. KG, Neustadt (DE)

(72) Inventors: Frank Schneider, Neustadt (DE); Rainer Luther, Neustadt (DE); Ulrich Ewringmann, Taufkirchen (DE)

(73) Assignee: Franz Schneider GmbH & Co. KG, Neustadt (DE)

( * ) Notice: Subject to any disclaimer, the term of this patent is extended or adjusted under 35 U.S.C. 154(b) by 113 days.

(21) Appl. No.: 14/082,258

(22) Filed: Nov. 18, 2013

(65) Prior Publication Data

US 2014/0189967 A1 Jul. 10, 2014

(30) Foreign Application Priority Data

Nov. 20, 2012 (DE) .......................... 10 2012 022 638

(51) Int. Cl.
| | |
|---|---|
| E01H 1/05 | (2006.01) |
| A63H 17/00 | (2006.01) |
| A47L 11/22 | (2006.01) |
| E01H 1/04 | (2006.01) |
| A47L 11/40 | (2006.01) |
| B62K 9/00 | (2006.01) |
| B62K 27/00 | (2006.01) |
| B62K 27/10 | (2006.01) |
| A63H 17/26 | (2006.01) |

(52) U.S. Cl.
CPC ................ *E01H 1/045* (2013.01); *A47L 11/22* (2013.01); *A47L 11/4069* (2013.01); *B62K 9/00* (2013.01); *B62K 27/00* (2013.01); *B62K 27/10* (2013.01); *E01H 1/056* (2013.01); *A63H 17/00* (2013.01); *A63H 17/266* (2013.01)

(58) Field of Classification Search
USPC .......................... 15/52.1, 82, 41.1, 48.1, 79.1; 280/288.4; 446/448, 449
See application file for complete search history.

(56) References Cited

U.S. PATENT DOCUMENTS

| | | | | | |
|---|---|---|---|---|---|
| 1,395,500 | A | * | 11/1921 | Kirby .............................. | 15/41.1 |
| 1,860,217 | A | * | 5/1932 | Azopardi ....................... | 280/160 |
| 2,145,738 | A | * | 1/1939 | Sandberg ........................ | 15/79.1 |
| 3,823,435 | A | * | 7/1974 | Rhodes et al. ................. | 15/79.1 |
| 3,947,912 | A | * | 4/1976 | Michaels ........................ | 15/79.1 |
| 4,037,284 | A | * | 7/1977 | McDonald ....................... | 15/83 |
| 4,042,994 | A | * | 8/1977 | Sassaman et al. .................. | 15/83 |
| 2009/0203293 | A1 | * | 8/2009 | Ewringmann ................ | 446/465 |

FOREIGN PATENT DOCUMENTS

| | | | |
|---|---|---|---|
| DE | 4120871 | * | 1/1993 |
| DE | 102008007895 A1 | | 8/2009 |

* cited by examiner

*Primary Examiner* — Mark Spisich
(74) *Attorney, Agent, or Firm* — Hammer & Associates, P.C.

(57) ABSTRACT

A sweeping device for a children's vehicle, particularly pedal vehicle, which is detachably connectable to the children's vehicle and is provided underneath a housing with a brush roller which is connected to an axle for rotation therewith, a driver wheel being arranged for driving the axle of the brush roller, the driver wheel lying on the ground in the operative position of the sweeping device and being drivingly connected via a gearing to the axle of the brush roller, is characterized in that the driver wheel has a hollow interior in which the gearing is positioned, and that the interior of the driver wheel is covered at an open side by a separate cover member.

10 Claims, 9 Drawing Sheets

SWEEPING DEVICE FOR A CHILDREN'S VEHICLE, PARTICULARLY FOR A PEDAL VEHICLE

The present invention refers to a sweeping device which is detachably connectable to a children's vehicle, particularly a pedal vehicle, the sweeping device containing a brush roller which is substantially horizontally arranged and which is positioned underneath a housing part and is connected to an axle for rotation therewith, a driver wheel being arranged for driving the axle, said driver wheel lying in the operative position of the sweeping device on the ground and being rotated during travel of the children's vehicle.

Such a sweeping device is known from DE 10 2008 007 895 A1. In this sweeping device the driver wheel is pivotably supported in a special way, so that upon steering movements of the children's vehicle the driver wheel is steered accordingly, whereby it is prevented that during cornering of the children's vehicle with the sweeping device the driver wheel is only sliding over the ground and does not drive the brush roller. The drive mechanism of the sweeping device is thereby relatively complicated.

It is the object of the present invention to design a sweeping device with a simpler structure, particularly with a simpler drive. Since the sweeping device can also be used by young children who are not always handling the play device with caution, the drive shall moreover be designed to substantially exclude any risk of injury posed by the same.

This object is achieved according to the invention by the features of patent claim 1.

Advantageous developments of the invention are characterized in the sub-claims.

According to the invention the gearing to which the axle of the brush roller is drivingly connected is positioned in the interior of the driver wheel that is closed by a cover to the outside, so that it is virtually inaccessible for the hands of the playing person and cannot cause any injury to the fingers. Since the gearing is virtually encapsulated in a cavity of the driver wheel, it can also not be damaged by external action or moved into an inoperative state. The driver wheel includes a running surface which preferably comprises a coating of a material having a high friction coefficient, such as rubber, and at least one substantially closed circular wall at its outside facing away from the brush roller whereas the opposite side of the driver wheel is open. This open side is closed by a cover which is preferably substantially disk-shaped and which will be described in more detail further below.

With great advantage it is suggested that the gearing in the driver wheel is a gear wheel mechanism. A friction gear, for instance, is however also possible.

With great advantage it is further suggested that a concentric gear rim is centrally mounted in the driver wheel, preferably formed on a circular side wall, which gear rim is thus connected to the driver wheel for rotation therewith, and that a gear wheel is meshing with said circular gear rim, said gear wheel being connected to the axle of the brush roller for rotation therewith. The gear rim preferably comprises external teeth, just like the gear wheel which is eccentrically held in the hollow driver wheel.

The cover disk of the driver wheel serves this purpose; the axle of the brush roller is inserted through said disk with an end section, and a bearing body in which the axle is rotatably supported is preferably pressed into the associated hole of the cover disk. The axle is subsequently connected to the gear wheel of the gearing for rotation therewith in that it is e.g. inserted into a sleeve-like attachment of the gear wheel.

The cover disk thereby holds the gear wheel in the position in which it is meshing with the gear rim.

The cover disk is provided at the side facing away from the brush roller with a central sleeve with internal thread, which serves as a thru axle, on which the driver wheel is rotatably seated. To this end the thru axle can engage into a sleeve-like attachment formed centrally in the gear rim.

The cover disk is indirectly fastened to the housing. In the preferred configuration the cover disk is mounted on a bar extending in parallel with the brush roller, in that said bar engages with an end section into a rectangular eyelet projecting from the cover disk, or into a mounting that is fastened to the front side of the disk. The bar has a form-fitting cross-section and is firmly mounted on the housing part.

It is further preferred that the other end section of the bar has attached thereto a cantilever beam which at its associated end section comprises a corresponding holding body with an insertion channel engaged by the bar. The cantilever beam is thus non-pivotably held on the bar. This could also be accomplished by another non-round cross-sectional shape of the bar and of the insertion channels of the holding body.

At its other end section the cantilever arm carries a roll which in the operative position of the sweeping device is lying on the ground just like the driver wheel. Moreover, the axle of the brush roller is rotatably supported in the cantilever beam in that at an axial intermediate position of the cantilever beam it passes through a corresponding hole, optionally with a pressed bearing body.

According to a further suggestion of the present invention the roll is fastened to a threaded spindle which is screwed into a threaded sleeve of the cantilever beam. The height position of the brush roller at this side is thus adjustable by rotating the threaded spindle.

The gearing of the sweeping device has a very simple structure, and the sweeping device is configured such that there is virtually no risk of injury even for inexperienced young children.

According to another suggestion of the invention the housing of the sweeping device is provided with a bracket with which it can be raised into a lifted position, for instance so that the children's vehicle can be moved to another place without being hindered by the sweeping device.

For detachably fastening the sweeping device the children's vehicle is preferably provided on its front face with a coupling mouth to which the sweeping device can be fastened such that it is non-pivotable in the horizontal plane. For fastening the sweeping device to the children's vehicle an adapter is particularly preferably provided, which adapter together with the aforementioned bracket may be screwed onto the side of the housing facing away from the brush roller.

Further details of the invention become apparent from the following description of a preferred embodiment and from the drawings, in which.

Figure 1:
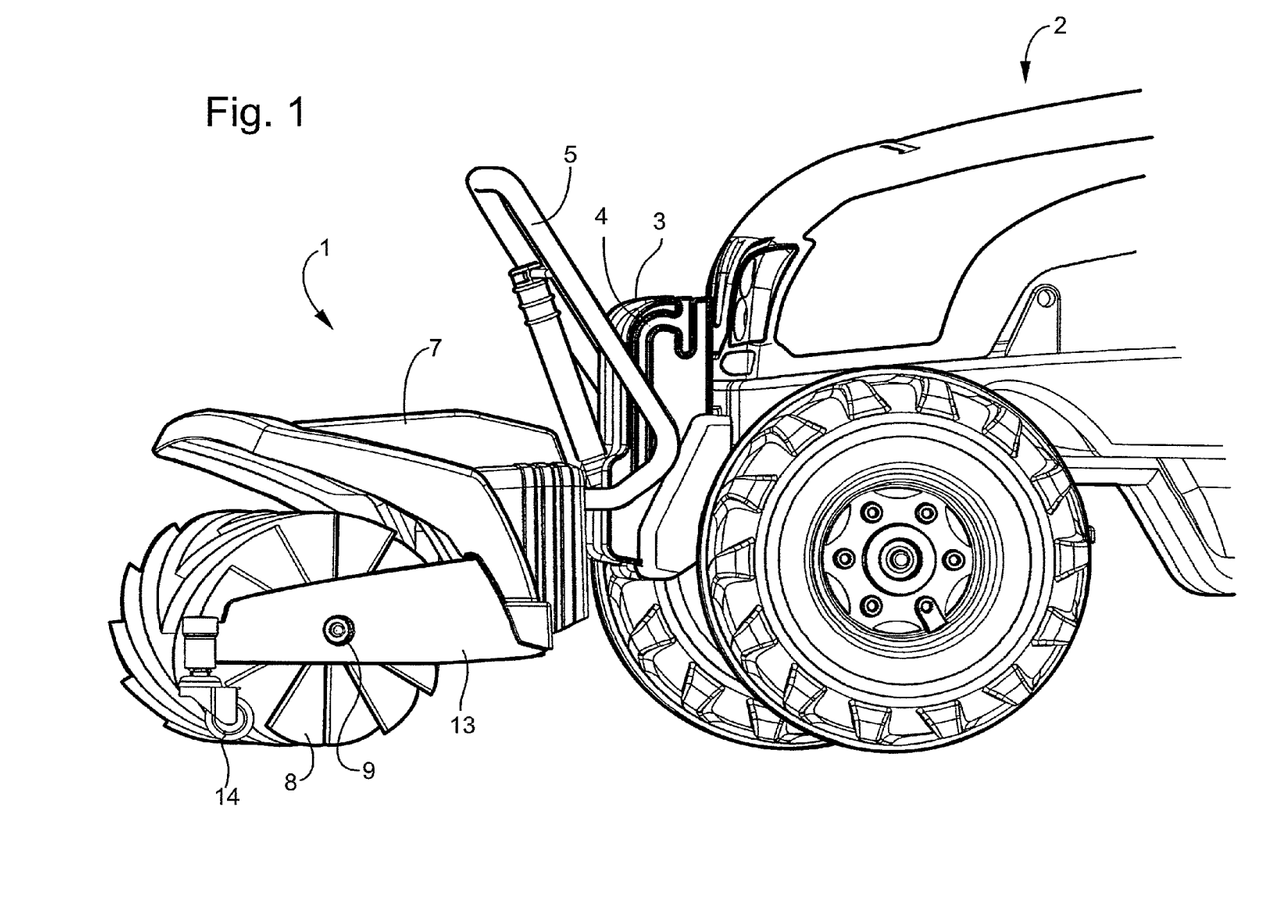
FIG. 1 shows an embodiment of the sweeping device on a children's vehicle in the operative position on the ground.
Figure 2:
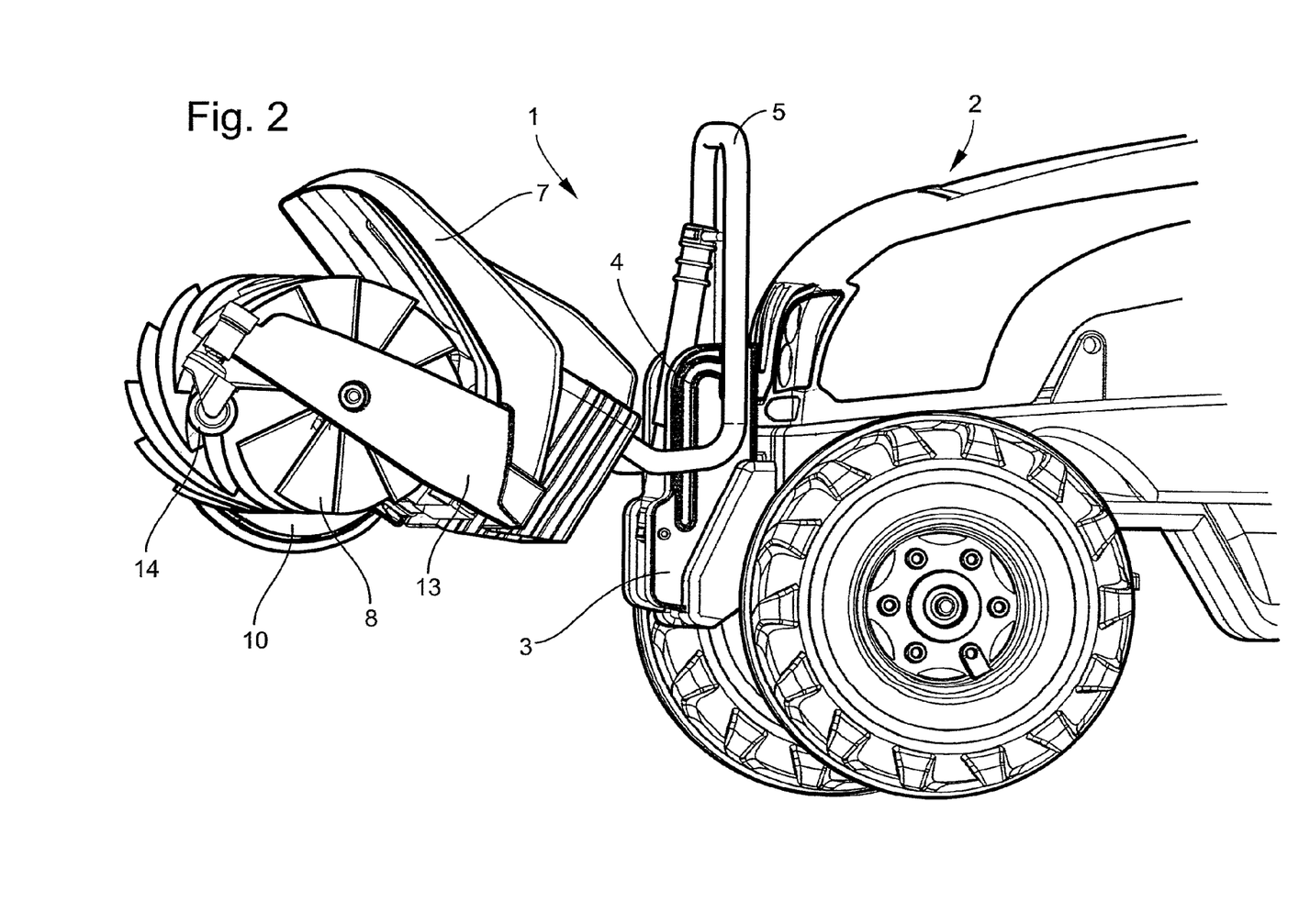
FIG. 2 shows the arrangement according to FIG. 1 with lifted sweeping device.
Figure 3:
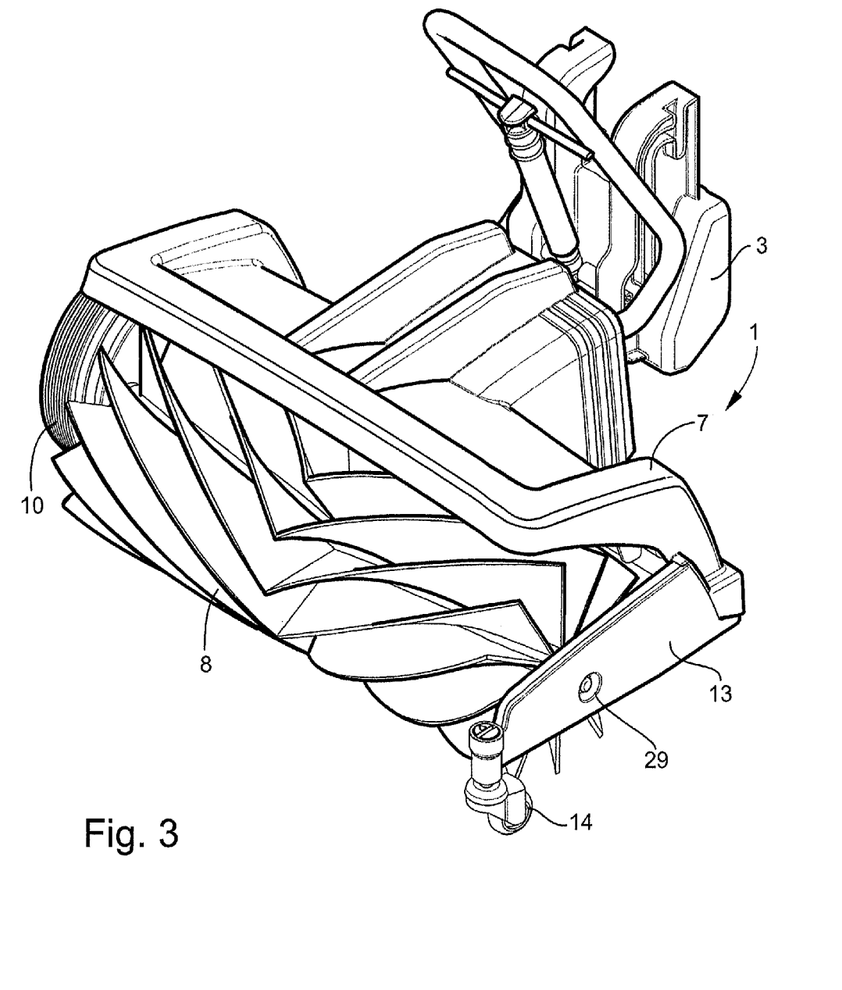
FIGS. 3 to 7 show the sweeping device according to FIG. 1 in a perspective view, a side view, a front view, a top view and in a lifted representation.
Figure 4:
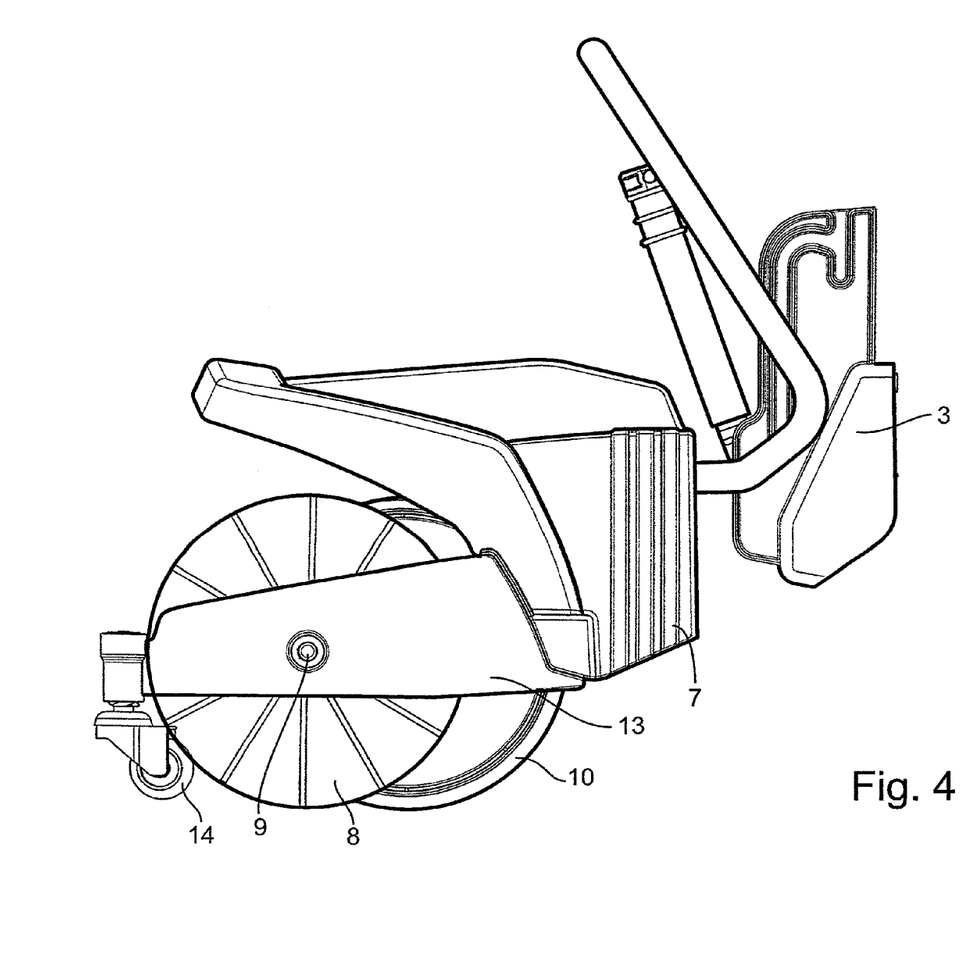
Figure 5:
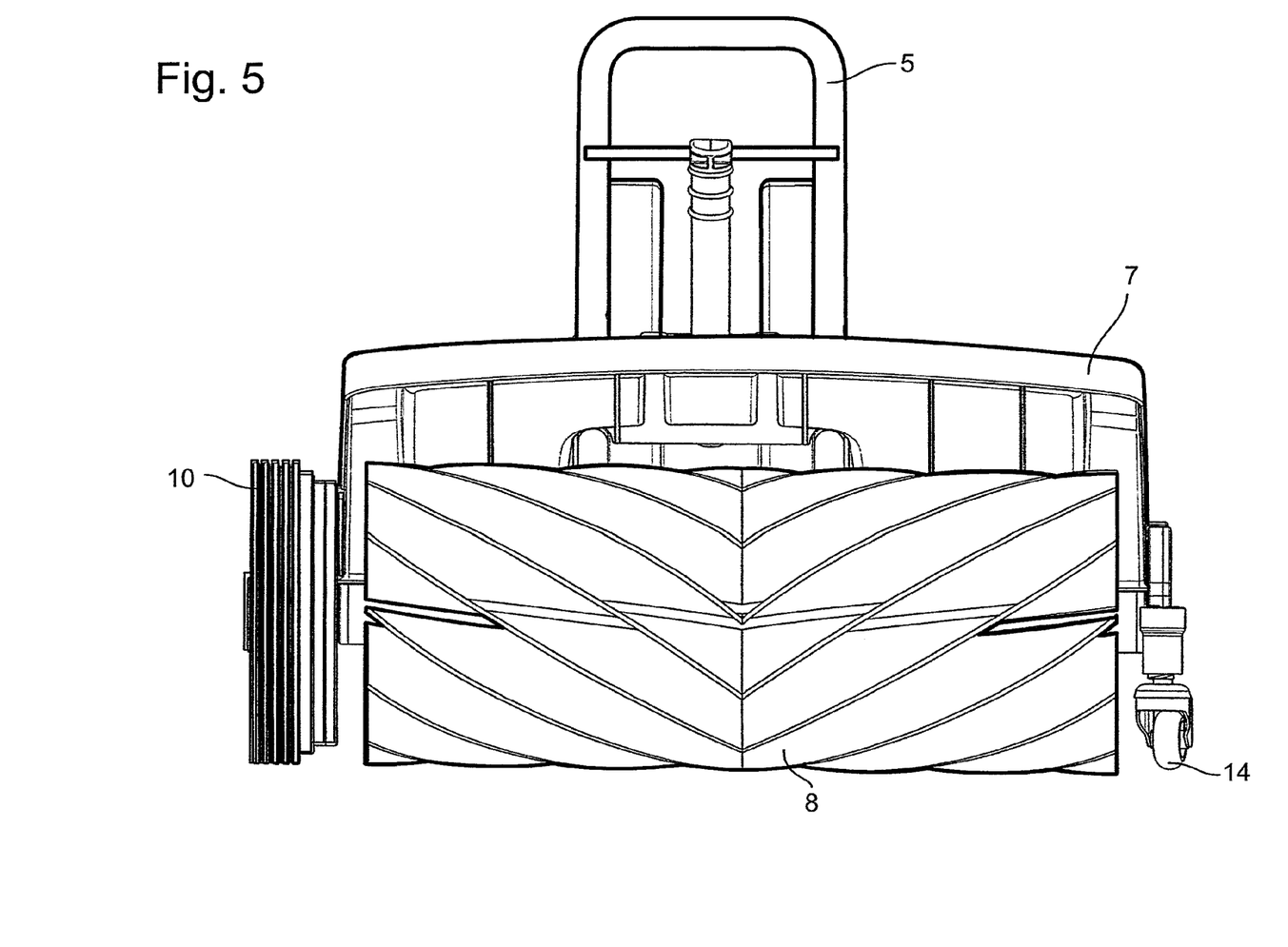
Figure 6:
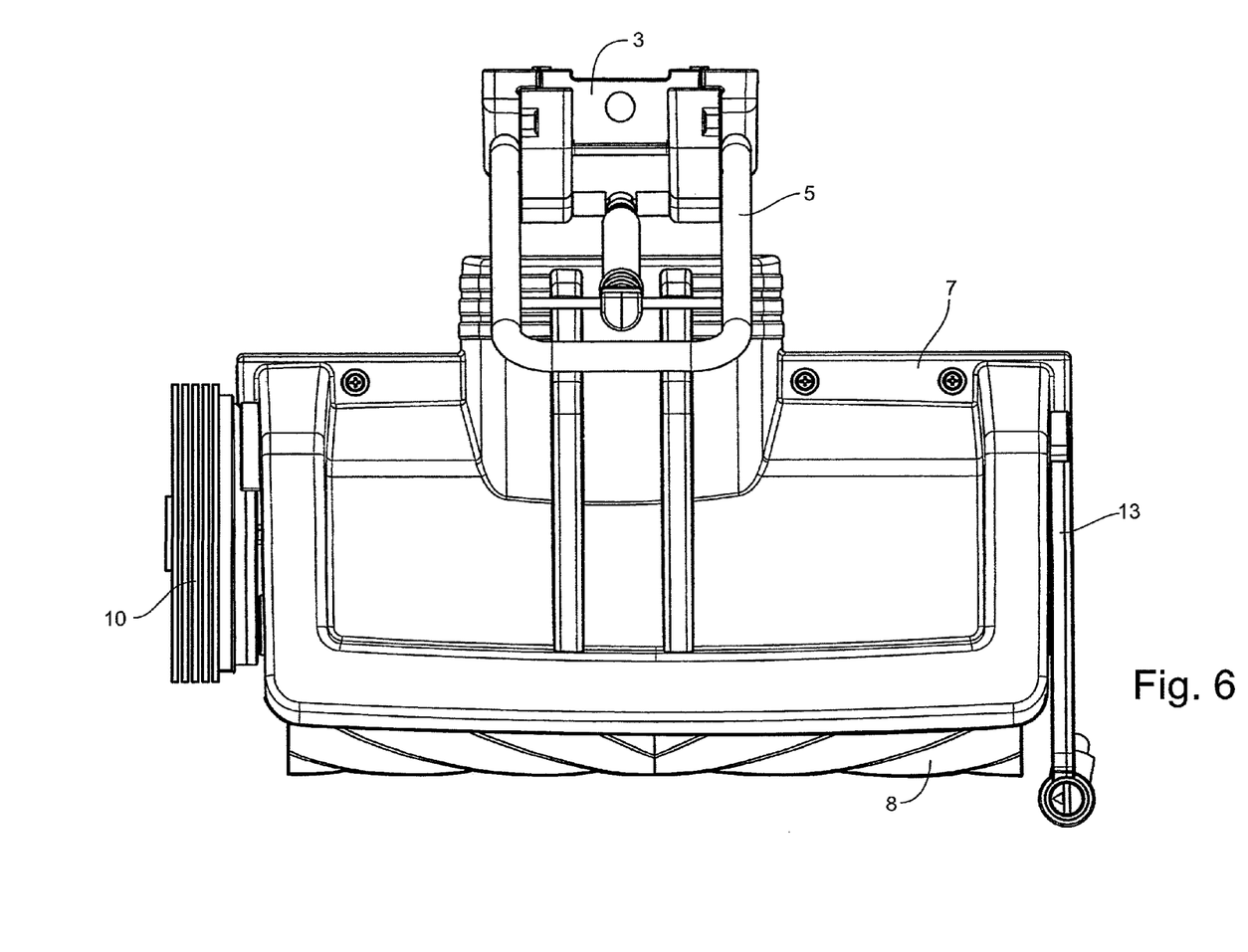
Figure 7:
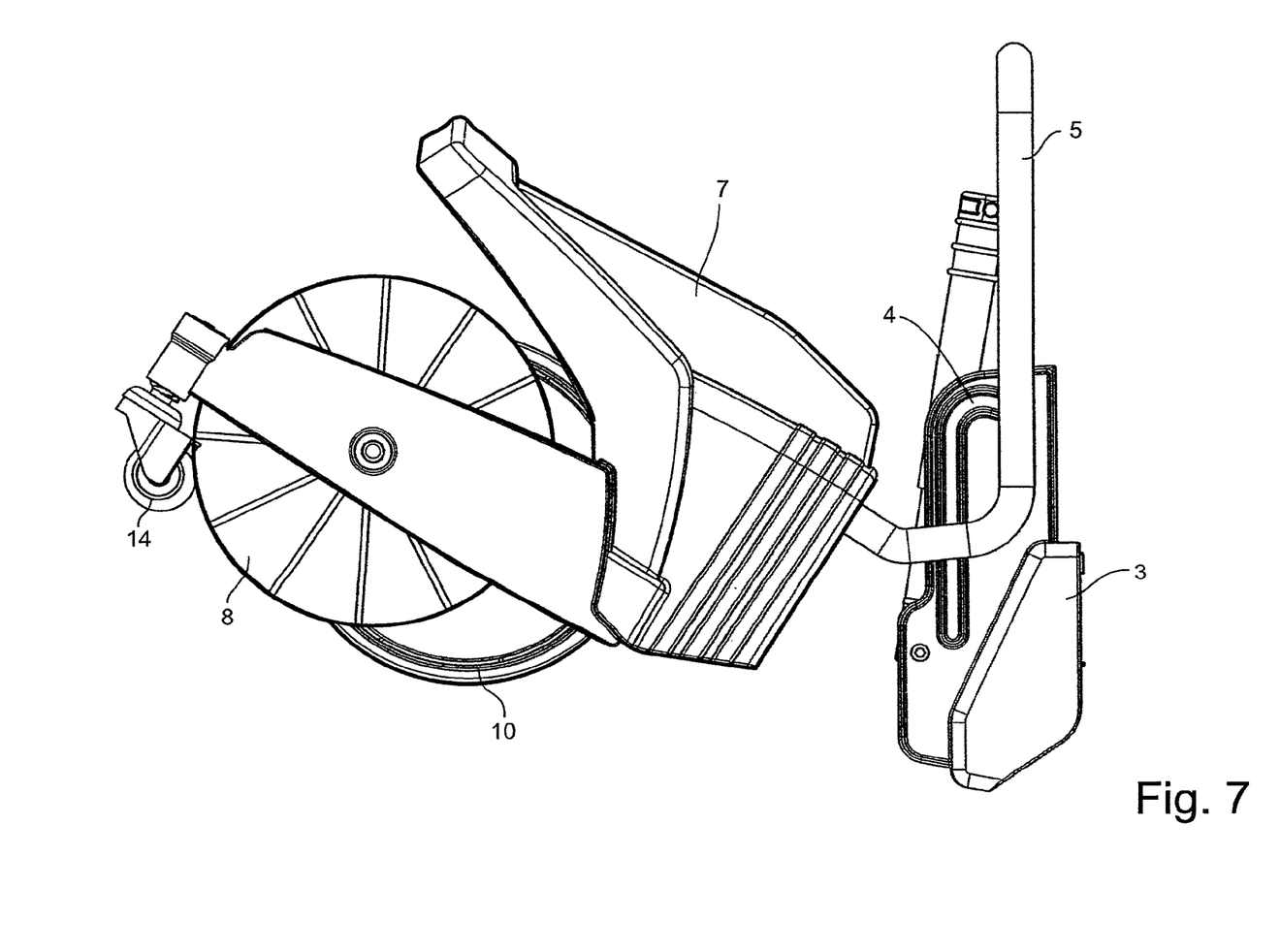

As shown in FIGS. 1 and 2, the sweeping device 1 is fastened at the front to a children's vehicle 2. To this end an adapter 3 is mounted detachably, in the horizontal plane rigidly, to a front coupling mouth of the children's vehicle, the adapter 3 including lateral guide rails 4 which are engaged by a bracket 5 with inner peg 6. The bracket 5 is provided with a preferably welded-on L-section 34 having screwed thereto a bar 27 which is screwed to a housing 7 of the sweeping device 1. The bracket 5 can be moved in the guide rails 4 such that the sweeping device 1 is either lying on the ground according to FIG. 1 or is fixed in a lifted position according to FIG. 2.

The sweeping device includes a brush roller 8 which during forward travel of the children's vehicle 2 rotates clockwise and transports away particles or sweepings lying on the ground to both sides. The brush roller 8 is connected to an axle 9 for rotation therewith, which axle is driven via a gear wheel mechanism 11, 12 by a driver wheel 10 lying on the ground in the operative position of the sweeping device 1 (see FIGS. 8 and 9). The brush axle 9 is rotatably supported in a cantilever beam 13 at its end section facing away from the driver wheel 10, the cantilever beam being supported at its free end on a roll 14.

Figure 8:
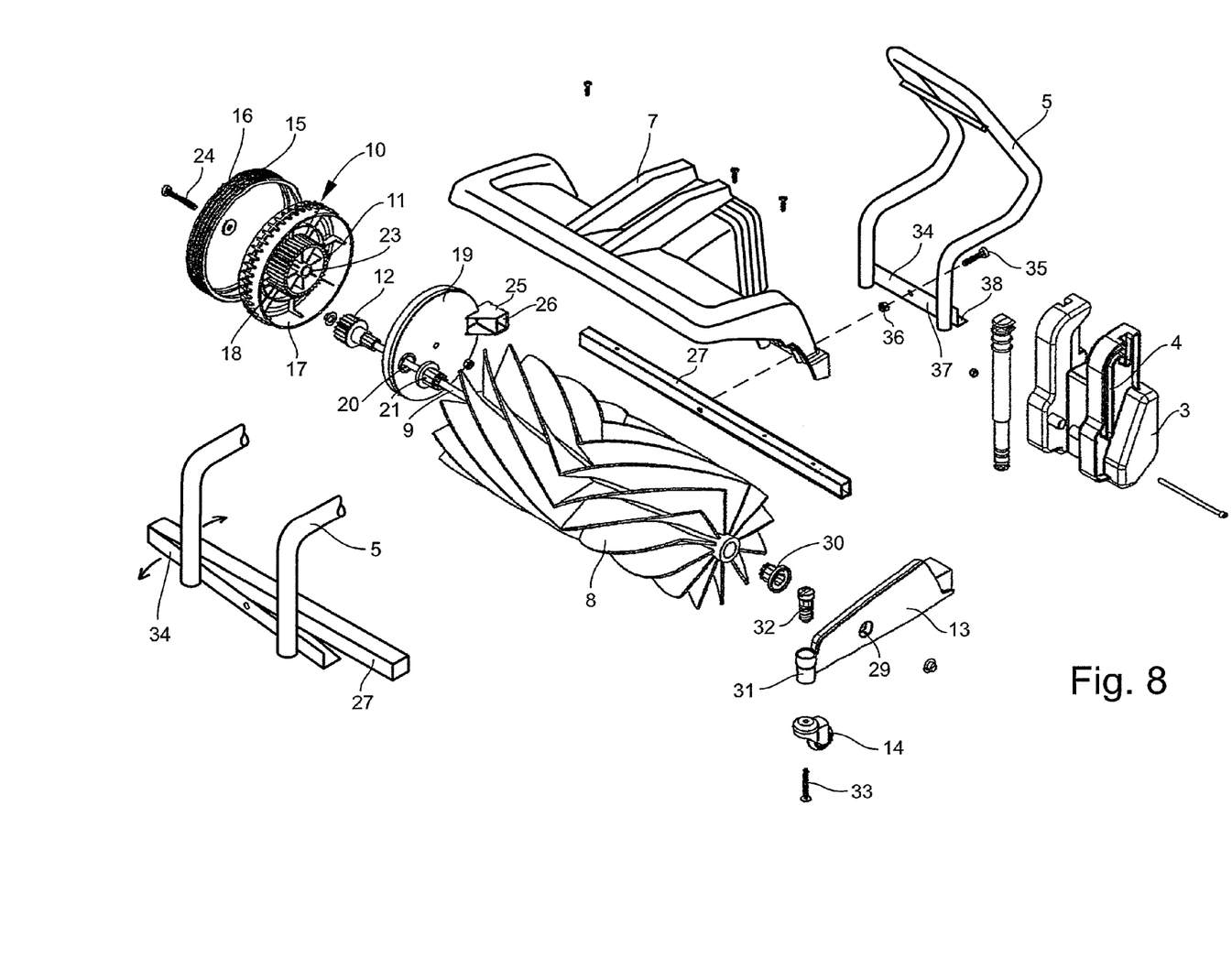
FIGS. 8 to 9 show the essential components of the sweeping device in two different exploded views.
Figure 9:
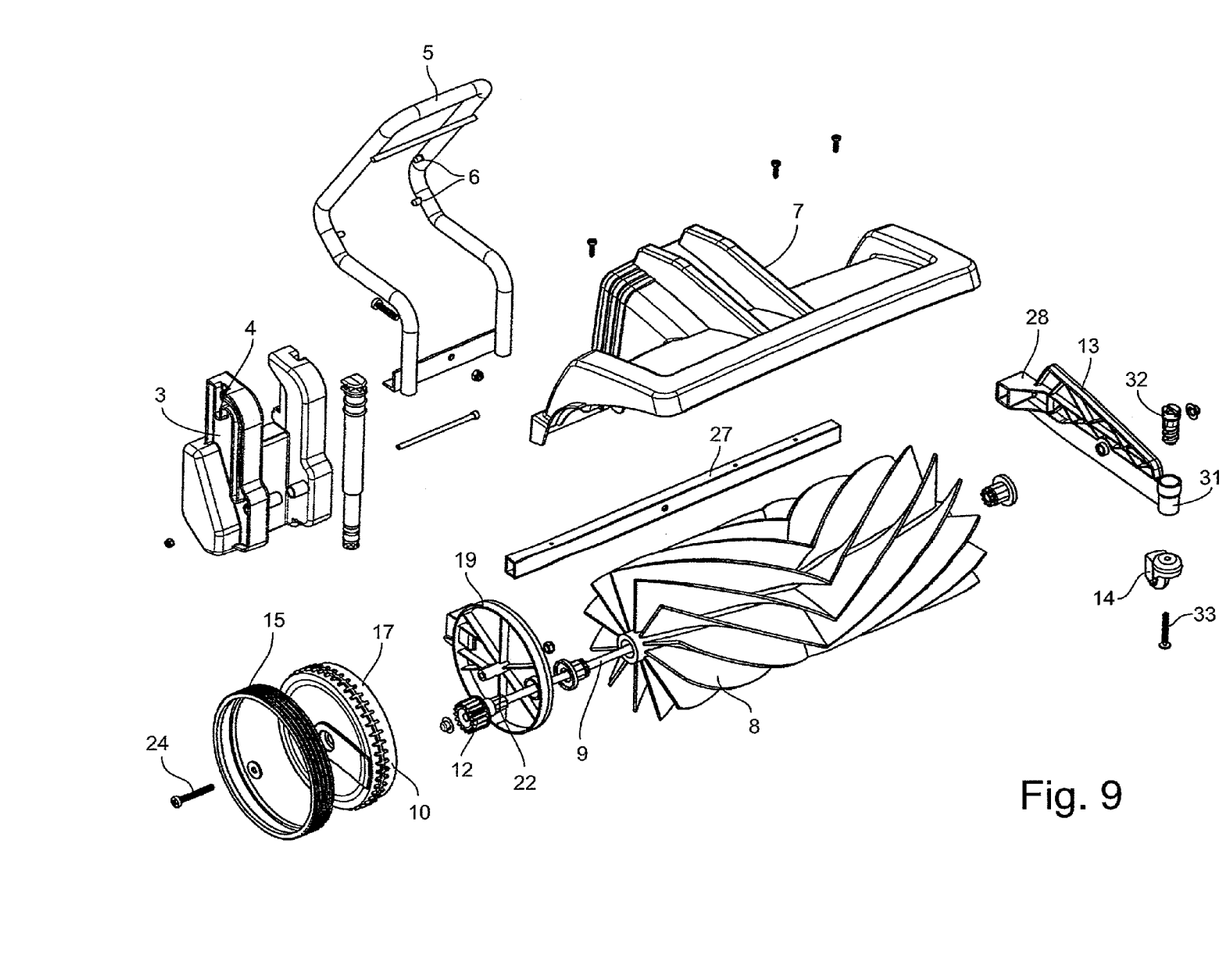

Reference is now made to FIGS. 8 and 9. The driver wheel 10 is composed of a bowl-shaped outer wheel 15 with a circular cylindrical running surface 16 having a high friction coefficient and of an inner wheel 17 which is inserted thereinto and is also bowl-shaped, with the circular cylindrical running surface 16 lying on the circular cylindrical circumferential surface 18 of the inner wheel. The inner wheel 17 includes a concentric gear rim 11 with external teeth which is formed on the side wall of the inner wheel. The two wheel members 17 and 15 are connected to each another for joint rotation and form the drive wheel 10 when put together. Alternatively, the driver wheel may also consist of a single bowl-shaped wheel body.

To cover the open side of the driver wheel 10, a disk 19 is provided that is not-rotatably held in a way described further below. The disk 19 includes an eccentric hole 20 having inserted thereinto a bearing body 21 in which the brush axle 9 extending therethrough is rotatably held. The end section of the brush axle 9 is connected to a gear wheel 12 with external teeth for rotation therewith, said gear wheel 12 meshing with the gear rim 11. The position of the gear wheel 12 on the gear rim 11 is fixed by the disk 19.

A threaded sleeve or thru axle 22 which engages into a central hub or sleeve 23 of the gear rim 11 projects centrally from the disk 19 at the side facing away from the brush roller 8. A screw 24 fastens the two wheel parts 15 and 17 to the fixed disk 19 such that the assembled driver wheel 10 is freely rotatable.

In this state the disk 19 which has a diameter slightly smaller than the inner diameter of the driver wheel 10 closes the open side thereof, so that the gear wheel mechanism 11, 12 is not accessible from the outside. The gap remaining between the fixed disk 19 and the rotating driver wheel 10 is so small that virtually no foreign substances can enter into the hollow interior of the driver wheel 10.

A bearing body 25 which has a rectangular insertion opening 26 for a bar 27, which is screwed on underneath the housing 7, is fastened to the inside of the disk 19 on the edge portion thereof. The bar 27 has a correspondingly rectangular cross-section and engages with its other end in form-fit manner into a similar bearing body 28 that is formed on the cantilever beam 13. The cantilever beam 13 is thus non-pivotably fastened to the bar 27.

The bar 27 is screwed onto the L-section 34 of the bracket 5 in such a manner that the bar 27 is rotatable in both directions about its longitudinal axis, with the whole sweeping device being pivoted in a corresponding manner about the L-section. To this end a resilient washer is preferably arranged between the screw head 35 and the bar 27 and between the screw nut 36 and the vertical web 37, and the webs 37 and 38 of the L-section 34 serve as an abutment, so that the rotatability of the bar 27 is restricted to preferably 3° to 5° in both directions. A tension spring which pulls the bracket 5 downwards and presses the sweeping device onto the ground is tensed between the adapter 3 and an upper crossbar of the bracket 5. Irregularities in the ground are thereby compensated, so that the driver wheel 10 is running without any blocking.

At an axial intermediate position the cantilever beam 13 comprises a hole 29 into which a bearing body 30 is inserted, in which the associated end section of the brush axle 9 is rotatably supported.

At its free end the cantilever beam 13 is provided with a threaded sleeve 31 having seated therein an adjusting screw 32 to which the roll 14 or the mounting thereof is fastened by means of a screw 33. The height position of the roll 14 is adjustable by rotating the screw 32.

The disk 19 and the cantilever beam 13 preferably consist of plastics and are reinforced by webs, as shown in FIG. 9. Like the housing, the driver wheel 10 which is composed of two wheel parts 15 and 17 preferably consists of plastics.

The invention claimed is:

1. A sweeping device for a children's vehicle comprising the sweeping device is detachably connectable to the children's vehicle and the sweeping device includes:
    a housing,
    a brush roller which is connected to an axle for rotation therewith and the brush roller is positioned underneath the housing,
    a driver wheel being arranged for driving the axle of the brush roller, the driver wheel lying on the ground in the operative position of the sweeping device, and being drivingly connected via a gearing to the axle of the brush roller, the driver wheel has a hollow interior in which the gearing is positioned,
    a separate cover component covers an open side of the hollow interior of the driver wheel, the separate cover component is a disk in which the axle of the brush roller is eccentrically rotatably supported, and the disk is non-rotatably held, a central thru axle on which the driver wheel is rotatably seated is fastened to the disk, and an edge portion of the disk has mounted thereon a bearing body with a insertion opening into which an end section of a bar of a corresponding cross-section is inserted, the bar being fastened to a bracket and to the housing.

2. The sweeping device according to claim 1 wherein the gearing is a gear wheel mechanism.

3. The sweeping device according to claim 2 wherein the gear wheel mechanism comprises a gear rim centrally arranged in the interior of the driver wheel and connected to the driver wheel for rotation therewith, and a gear wheel meshing with the gear rim and connected to the axle of the brush roller for rotation therewith.

4. The sweeping device according to claim 1 wherein an other end section of the bar has attached thereto a cantilever beam which at its other end carries a roll which in the operative position of the sweeping device is lying on the ground, and the axle of the brush roller is rotatably supported in a hole of the cantilever beam.

5. The sweeping device according to claim 4 wherein the roll is fastened to a threaded spindle which is in engagement with a threaded sleeve of the cantilever beam, so that the height position of the axle of the brush roller is adjustable.

6. The sweeping device according to claim 1 wherein the sweeping device can be fastened via an adapter to a coupling mouth of the children's vehicle, wherein the fastening is rigid in the horizontal plane.

7. The sweeping device according to claim 1 wherein the bar is rotatably arranged in both directions by a small angle about its longitudinal axis.

8. The sweeping device according to claim 1 wherein the sweeping device is liftable from an operative position into a position spaced apart from the ground.

9. A children's vehicle comprising the sweeping device according to claim 1.

10. The sweeping device according to claim 1 wherein the insertion opening is rectangular.

* * * * *